United States Patent
Chen et al.

(10) Patent No.: US 7,616,374 B2
(45) Date of Patent: Nov. 10, 2009

(54) ELECTROPHORETIC DISPLAYS WITH IMPROVED HIGH TEMPERATURE PERFORMANCE

(75) Inventors: Huiyong Paul Chen, San Jose, CA (US); HongMei Zang, Sunnyvale, CA (US); Cheri Pereira, Fremont, CA (US); Jack Hou, Fremont, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 192 days.

(21) Appl. No.: 11/487,596

(22) Filed: Jul. 13, 2006

(65) Prior Publication Data

US 2007/0035497 A1 Feb. 15, 2007

Related U.S. Application Data

(63) Continuation-in-part of application No. 10/665,898, filed on Sep. 18, 2003, now abandoned.

(60) Provisional application No. 60/413,225, filed on Sep. 23, 2002.

(51) Int. Cl.
*G02B 26/00* (2006.01)
(52) U.S. Cl. .................................... 359/296
(58) Field of Classification Search .................. 359/269
See application file for complete search history.

(56) References Cited

U.S. PATENT DOCUMENTS

| 3,281,426 A | 10/1966 | Van Dyke Tiers |
| 3,612,758 A | 10/1971 | Evans et al. |
| 3,958,199 A | 5/1976 | Berger et al. |
| 3,979,212 A | 9/1976 | Peters et al. |
| 4,135,789 A | 1/1979 | Hall |
| 4,192,762 A | 3/1980 | Osborn |
| 4,680,103 A | 7/1987 | Beilin et al. |
| 4,985,535 A | 1/1991 | Takada et al. |
| 5,071,909 A * | 12/1991 | Pappin et al. .............. 525/54.1 |
| 5,326,846 A | 7/1994 | Nagai et al. |
| 5,334,690 A | 8/1994 | Schafheutle et al. |
| 5,360,873 A | 11/1994 | Saito et al. |

(Continued)

FOREIGN PATENT DOCUMENTS

EP 0 305 175 3/1989

(Continued)

OTHER PUBLICATIONS

Allen, K. (Oct. 2003). Electrophoretics Fulfilled. *Emerging Displays Review: Emerging Display Technologies, Monthly Report*—Oct. 2003, 9-14.

(Continued)

*Primary Examiner*—Ricky L Mack
*Assistant Examiner*—Vipin M Patel
(74) *Attorney, Agent, or Firm*—Howrey LLP

(57) ABSTRACT

The invention is directed to a novel sealing composition and a method for improving performance of an electrophoretic display, especially at high temperatures. The invention is also directed to an electrophoretic display comprising display cells wherein said display cells are filled with an electrophoretic fluid and sealed with a sealing layer formed from a sealing composition comprising a thermoplastic elastomer and a crosslinking system.

34 Claims, 3 Drawing Sheets

U.S. PATENT DOCUMENTS

| | | | |
|---|---|---|---|
| 5,410,011 | A | 4/1995 | Konishi et al. |
| 5,462,797 | A | 10/1995 | Williams et al. |
| 5,490,893 | A | 2/1996 | Enlow et al. |
| 5,659,408 | A | 8/1997 | Wenyon |
| 5,827,926 | A | 10/1998 | Shimizu |
| 5,837,766 | A * | 11/1998 | Metro et al. ............... 524/495 |
| 5,908,899 | A | 6/1999 | Tahara et al. |
| 5,930,026 | A | 7/1999 | Jacobson et al. |
| 5,942,330 | A | 8/1999 | Kelley |
| 5,943,113 | A | 8/1999 | Ichihashi |
| 5,961,804 | A | 10/1999 | Jacobson et al. |
| 6,067,135 | A | 5/2000 | Shimizu et al. |
| 6,083,630 | A | 7/2000 | Robe |
| 6,092,392 | A | 7/2000 | Verlinden et al. |
| 6,118,502 | A | 9/2000 | Yamazaki et al. |
| 6,239,896 | B1 | 5/2001 | Ikeda |
| 6,254,751 | B1 * | 7/2001 | Reiter et al. ............... 204/487 |
| 6,300,932 | B1 * | 10/2001 | Albert ............... 345/107 |
| 6,327,072 | B1 | 12/2001 | Comiskey et al. |
| 6,353,078 | B1 | 3/2002 | Murata et al. |
| 6,452,038 | B1 | 9/2002 | Rao et al. |
| 6,512,626 | B1 | 1/2003 | Schmidt |
| 6,540,384 | B1 | 4/2003 | Rosevear |
| 6,545,797 | B2 | 4/2003 | Chen et al. |
| 6,574,034 | B1 * | 6/2003 | Lin et al. ............... 359/296 |
| 6,672,921 | B1 | 1/2004 | Liang et al. |
| 6,750,844 | B2 | 6/2004 | Nakanishi |
| 6,753,067 | B2 | 6/2004 | Chen et al. |
| 6,788,449 | B2 | 9/2004 | Liang et al. |
| 6,795,138 | B2 | 9/2004 | Liang et al. |
| 6,816,146 | B2 * | 11/2004 | Harada et al. ............... 345/107 |
| 6,831,769 | B2 | 12/2004 | Holman et al. |
| 6,864,875 | B2 | 3/2005 | Drzaic et al. |
| 6,930,818 | B1 | 8/2005 | Liang et al. |
| 6,933,098 | B2 | 8/2005 | Chan-Park et al. |
| 6,982,178 | B2 | 1/2006 | LeCain et al. |
| 7,005,468 | B2 * | 2/2006 | Zang et al. ............... 524/474 |
| 7,144,942 | B2 | 12/2006 | Zang et al. |
| 7,166,182 | B2 | 1/2007 | Pereira et al. |
| 2001/0003755 | A1 * | 6/2001 | Fiori et al. ............... 516/67 |
| 2002/0008898 | A1 | 1/2002 | Katase |
| 2002/0131147 | A1 * | 9/2002 | Paolini et al. ............... 359/296 |
| 2002/0188053 | A1 | 12/2002 | Zang et al. |
| 2004/0085619 | A1 | 5/2004 | Wu et al. |
| 2004/0112525 | A1 | 6/2004 | Pereira et al. |
| 2004/0120024 | A1 | 6/2004 | Chen et al. |
| 2004/0170776 | A1 | 9/2004 | Liang et al. |
| 2004/0219306 | A1 | 11/2004 | Wang et al. |
| 2005/0035941 | A1 | 2/2005 | Albert et al. |
| 2007/0036919 | A1 | 2/2007 | Wang et al. |

FOREIGN PATENT DOCUMENTS

| | | |
|---|---|---|
| EP | 1 013 690 | 6/2002 |
| WO | WO 01/67170 A1 | 9/2001 |
| WO | WO 02/01281 A2 | 1/2002 |
| WO | WO 02/065215 | 8/2002 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Bayer Material Science Product Data Sheets: Desmodur Z 4470 BA (p. 1), Nov. 3, 2005.

Bayer Material Science Product Data Sheets: Desmodur Z 4470 SN (p. 1), Nov. 3, 2005.

Chaug, Y.S., Haubrich, J.E., Sereda, M. And Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M., << The Applications for the Revolutionary Electronic Paper Technology >>, OPTO News & Letters, Jul. 2003, 102, pp. 37-41 (in Chinese, English abstract attached, full translation available upon request).

Chen, S.M., << The New Applications and the Dynamics of Companies >>, TRI, May 2003 (in Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Engineeringtalk (Huntsman polyurethanes), *Thermoplastic Polyurethanes Meet Diverse Needs*, pp. 1-2, copy rihgt 2000-2005, http://www.engineeringtalk.com/news/hus/hus100.html downloaded Apr. 25, 2006.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hopper and Novotny, (1979) An Electrophoretic Display, its Proterties, Mocel, and Addressing. *IEEE Trans. Electr. Dev.*, 26(8) : 1148-1152.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C. and Lee, H., << SiPix Microcup(R) Electronic Paper—An Introduction >>, Advanced Display, Jun. 2003, Issue 3, pp. 4-9 (in Chinese, English abstract attached, full translation available upon request).

Liang, R.C. And Tseng, S., << Microcup(R) LCD, A New Type of Dispersed LCD by A Roll-to-Roll Manufacturing Process >>, IDMC '03, Feb. 18-21, Taipei, Liang, Paper We-02-04.

Liang, R.C. et al, << Microcup Electrophoretic Displays by Roll-to-Roll Manufacturing Processes >>, IDW '02, Dec. 4-6, pp. 1337-1340.

Liang, R.C. et al, << Microcup(R) Active and Passive Matrix Electrophoretic Displays by A Roll-to-Roll Manufacturing Processes >>, SID Digest, May 21-22, 2003, 20.1/R.C. Liang.

Liang, R.C. et al, << Microcup(R) displays : Electronic Paper by Roll-to-Roll Manufacturing Processes >>, Journal of the SID, vol. 11/4, Feb. 18-23, 2003, pp. 621-628.

Liang, R.C. et al, << Passive Matrix Microcup(R) Electrophoretic Displays >>, IDMC '03, Feb. 18-21, Taipei, Liang, Paper Fr-17-5.

Liang, R.C., (Feb. 2005) *Flexible and Roll-able Displays/Electronic Paper—A Brief Technology Overview*. Flexible Display Forum, 2005, Taiwan.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology Expo & Conference.

Liang, R.C., << Microcup(R) Electrophoretic and Liquid Crystal Displays by Roll-to-Roll Manufacturing Processes >>, USDC Flexible Microelectronics & Displays Conference, Feb. 3-4, 2003, Phoenix, Arizona, USA.

Nikkei Microdevices, << Newly-Developed Color Electronic Paper Promises—Unbeatable Production Efficiency >>, Dec. 2002 (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, pp. 1587-1589.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. and Liang, R.C., << Microcup Electronic Paper by Roll-to-Roll Manufacturing Processes >>, Spectrum, 2003, Summer, 16/2, pp. 16-21.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

ELECTROPHORETIC DISPLAYS WITH IMPROVED HIGH TEMPERATURE PERFORMANCE

CROSS-REFERENCES TO RELATED APPLICATIONS

This application is a continuation-in-part application of U.S. application Ser. No. 10/665,898, filed Sep. 18, 2003, now abandoned which claims the benefit of U.S. Provisional Application No. 60/413,225 filed Sep. 23, 2002. The contents of the above applications are incorporated herein by reference in their entirety.

BACKGROUND OF THE INVENTION

1. Field of the Invention

The invention is directed to a novel sealing composition and a method for improving performance of an electrophoretic display, especially at high temperatures.

2. Description of Related Art

The electrophoretic display (EPD) is a non-emissive device based on the electrophoresis phenomenon of charged pigment particles suspended in a dielectric solvent. It was first proposed in 1969. The display usually comprises two plates with electrodes placed opposing each other and separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, IEEE Trans. Electr. Dev., 26(8):1148-1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology is disclosed in U.S. Pat. No. 6,930,818 (corresponding to WO 01/67170), U.S. Pat. No. 6,672,921 (corresponding to WO 02/01281), U.S. Pat. No. 6,933,098, (corresponding to WO 02/65215) and U.S. Publication No. 2002-0188053; all of which are incorporated herein by reference.

A typical microcup-based display cell is shown in FIG. 1. The cell (10) is sandwiched between a first electrode layer (11) and a second electrode layer (12). A primer layer (13) is optionally present between the cell (10) and the second electrode layer (12). The cell (10) is filled with an electrophoretic fluid and sealed with a sealing layer (14). The first electrode layer (11) is laminated onto the sealed cell, optionally with an adhesive (15).

The display panel may be prepared by microembossing or photolithography as disclosed in WO 01/67170. In the microembossing process, an embossable composition is coated onto the conductor side of the second electrode layer (12) and embossed under pressure to produce the microcup array.

The embossable composition may comprise a thermoplastic, thermoset or a precursor thereof which may be a multifunctional acrylate or methacrylate, vinylbezene, vinylether, epoxide and the like, or an oligomer or polymer thereof. In one alternative, multifunctional acrylates and their oligomers are used. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the microcups prepared from the microembossing process. The composition may contain an oligomer, a monomer, additives and optionally a polymer. The glass transition temperature (g) of the embossable composition may range from about −70° C. to about 150° C., preferably from about −20° C. to about 50° C.

The microembossing process is carried out at a temperature higher than the Tg of the embossable composition. A heated male mold or a heated housing substrate against which the mold presses may be used to control the microembossing temperature and pressure.

The mold may be released during or after the embossable composition is hardened to reveal an array of microcups (10). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the embossable composition.

A thin primer layer (13) is optionally precoated onto the conductor layer to improve the release properties of the mold. The composition of the primer layer may be the same or different from the embossing composition.

In general, the dimension of individual cells may be in the range of about $10^2$ to about $10^6$ μm$^2$, preferably from about $10^3$ to about $10^5$ μm$^2$. The depth of the cells may be in the range of about 3 to about 100 microns, preferably from about 10 to about 50 microns. The ratio between the area of openings to the total area of the microcup array may be in the range of from about 0.05 to about 0.95, preferably from about 0.4 to about 0.9. The width or length of the openings may be in the range of from about 15 to about 450 μm, preferably from about 25 to about 250 μm, from edge to edge of the openings.

The microcups are filled with an electrophoretic fluid and sealed as disclosed in WO 01/67170, U.S. Publication No. 2002-0188053 or U.S. Publication No. 2004-0112525. The sealing of the microcups may be accomplished in a number of ways. For example, it may be accomplished by a two-pass sealing process involving overcoating the filled microcups with a sealing composition comprising a solvent and a sealing material selected from the group consisting of thermoplastic elastomers, polyvalent acrylates or methacrylates, cyanoacrylates, polyvalent vinyls including vinylbenzene, vinylsilane and vinylether, polyvalent epoxide, polyvalent isocyanate, polyvalent allyl, oligomers or polymers containing crosslinkable functional groups and the like. Additives such as a polymeric binder or thickener, photoinitiator, catalyst, filler, colorant or surfactant may be added to the sealing composition to improve the physico-mechanical properties and the optical properties of the display. The sealing composition is incompatible with the electrophoretic fluid and has a specific gravity lower than that of the electrophoretic fluid.

Upon solvent evaporation, the sealing composition forms a conforming seamless seal on top of the electrophoretic fluid. The sealing layer may be further hardened by heat, radiation or other curing methods. In one embodiment, sealing is accomplished with a composition comprising a thermoplastic elastomer. Examples of thermoplastic elastomers include polyurethanes, polyesters, tri-block or di-block copolymers of styrene or a-methylstyrene and isoprene, butadiene or ethylene/butylene, such as the Kraton™ D and G series from Kraton Polymer Company. Crystalline rubbers such as poly (ethylene-co-propylene-co-5-methylene-2-norbornene) and other EPDMs (Ethylene Propylene Diene Rubber terpolymers) from Exxon Mobil have also been found useful.

Alternatively, the sealing composition may be dispersed into an electrophoretic fluid and filled into the microcups (i.e., one pass sealing process). The sealing composition is incompatible with the electrophoretic fluid and is lighter than the electrophoretic fluid. Upon phase separation and solvent evaporation, the sealing composition floats to the top of the filled microcups and forms a seamless sealing layer thereon. The sealing layer may be further hardened by heat, radiation or other curing methods.

The sealed microcups finally are laminated with the first electrode layer (11) which may be pre-coated with an adhesive (15) such as a pressure sensitive adhesive, hot melt adhesive, moisture or UV curable adhesive.

The sealing layer formed seamlessly encloses and isolates the electrophoretic fluid within the microcups. It also provides good adhesion between the microcup-based cells (10) and the first electrode layer (11) and enables an efficient roll-to-roll production of the displays.

In order to improve the switching performance, it is disclosed in U.S. Publication No. 2004-0085619, that a conductive material, in the form of particles, may be added to the sealing composition. Suitable conductive materials include organic conducting compounds or polymers, carbon black, carbonaceous particles, graphite, metals, metal alloys and conductive metal oxides.

It is also disclosed in the same co-pending application that a high absorbance dye or pigment may be added to the adhesive layer to improve the display performance. Suitable dyes or pigments may have an absorption band in the range of 320-800 nm, preferably in the range of 400-700 nm. Useful dyes and pigments include metal phthalocyanines and naphthalocyanines (wherein the metal may be Cu, Al, Ti, Fe, Zn, Co, Cd, Mg, Sn, Ni, In, V or Pb), metal porphines (wherein the metal may be Co, Ni or V), azo (such as diazo or polyazo) dyes, squaraine dyes, perylene dyes and croconine dyes.

While the microcup-based electrophoretic displays have shown good display performance and involve low cost for their manufacture, there are still features that can be further improved.

The whole content of each document referred to in this application is incorporated by reference into this application in its entirety.

SUMMARY OF THE INVENTION

The first aspect of the present invention is directed to a novel sealing composition comprising a thermoplastic elastomer and a crosslinking system. The crosslinking system may comprise a multifunctional isocyanate, isothiocyanate, epoxide or aziridine and a crosslinker. Useful crosslinkers for the multifunctional isocyanate or isothiocyanate include multifunctional alcohols, thiols, ureas, thioureas, amines, anilines, water and the like. Useful crosslinkers for the multifunctional epoxide or aziridine include multifunctional alcohols, thiols, carboxylic acids, ureas, thioureas, primary and secondary amines, anilines, anhydrides, Lewis acids and the like. The total concentration of the multifunctional isocyanate, isothiocyanate, epoxide or aziridine and the crosslinker may be in the range of about 2-50% by weight, preferably about 10-40% by weight, of the dry weight of the sealing layer.

The crosslinking reaction may be completed during or after the sealing process. A catalyst may also be used to speed up the crosslinking reaction.

The EPD having cells sealed by the sealing composition of the present invention shows significant improvement in contrast ratio, image uniformity, structure integrity and longevity in a very wide range of temperatures.

Therefore the second aspect of the invention is directed to a method for improving display performance, structure integrity and longevity of an electrophoretic display, which method comprises sealing the filled display cells with a composition comprising a thermoplastic elastomer and a crosslinking system.

The third aspect of the invention is directed to an electrophoretic display wherein the filled display cells are sealed with a composition of the first aspect of the invention.

DETAILED DESCRIPTION OF THE INVENTION

Figure 1:
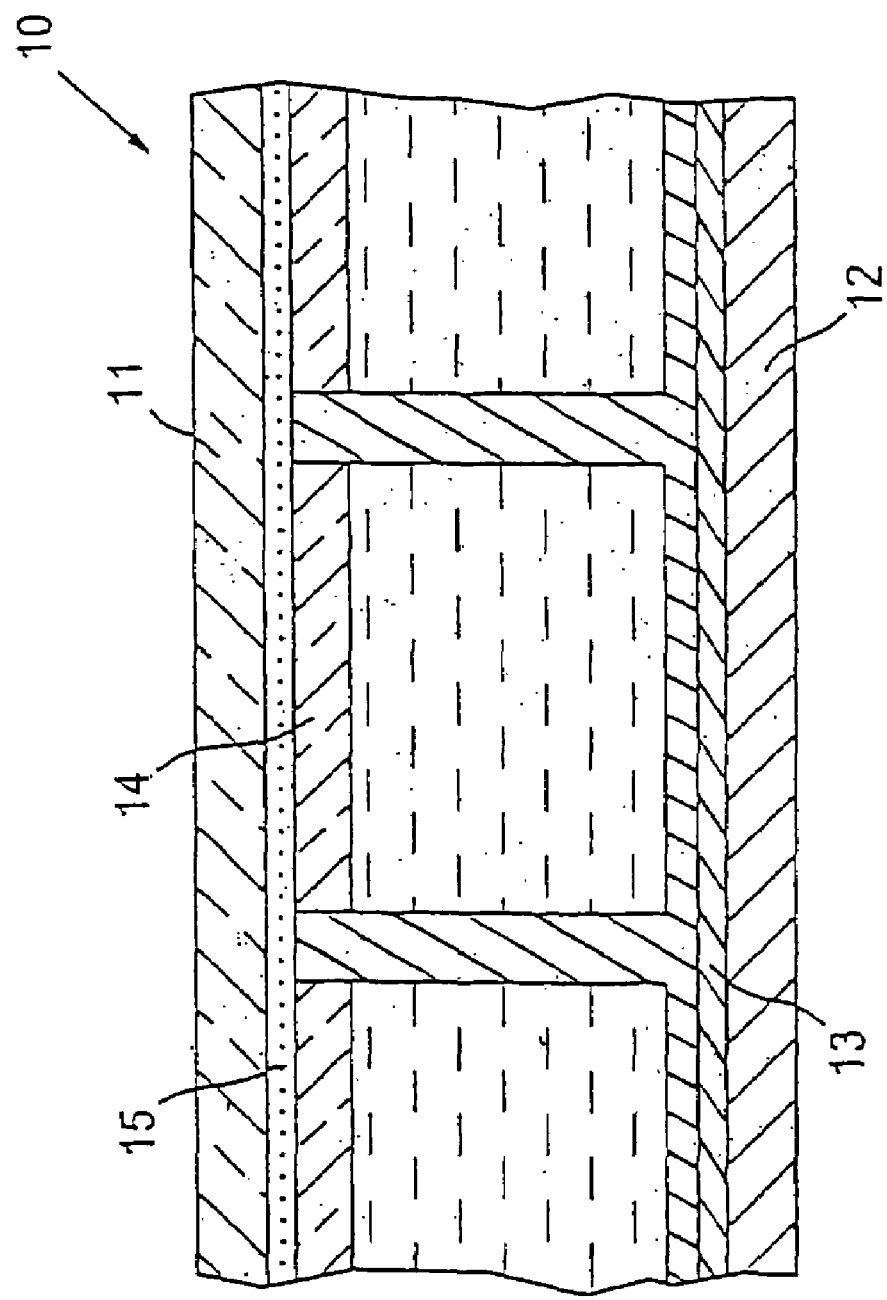
FIG. 1 depicts a typical microcup-based electrophoretic display cell.

The present invention is directed to a novel sealing composition comprising a thermoplastic elastomer and a crosslinking system. The crosslinking system may comprise a multifunctional isocyanate, isothiocyanate, epoxide or aziridine and a crosslinker.

It has been demonstrated that a seamless sealing with superior film integrity over the electrophoretic fluid in the microcups may be achieved with a thermoplastic elastomer. The thermoplastic elastomers are particularly useful in the 2-pass sealing process as disclosed in WO 01/67170 and U.S. Ser. No. 09/874,391 filed on Jun. 4, 2001. Their usefulness in the sealing of the display cells could be due to their ability to form physical crosslinking during drying of the sealing layer.

A list of thermoplastic elastomers in general can be found in the textbook, such as "Handbook of Thermoplastic Elastomers" edited by B. M. Walker; Van Norstrand Reinhold Co., (1979). Examples of suitable thermoplastic elastomers, in the context of the present invention, include polyurethanes, polyesters, polyolefins and tri-block or di-block copolymers of styrene or α-methylstyrene and isoprene, butadiene or ethylene/butylene, such as the Kraton™ D and G series from Kraton Polymer Company. Crystalline rubbers such as poly (ethylene-co-propylene-co-5-methylene-2-norbornene) and other EPDMs (Ethylene Propylene Diene Rubber terpolymers) from Exxon Mobil have also been found useful.

A variety of vulcanization mechanisms may be employed to crosslink the unsaturated thermoplastic elastomers. Review of the vulcanization of rubbers may be found in "Vulcanization of Elastomers" ed. by G. Alliger and I. J. Sjothun, Robert E. Krieger Publishing Co., (1978); "Rubber Technology and Manufacture" ed. by C. M. Blow and C. Hepburn, Butterworth Scientific, (1982); "Rubber Chemistry" ed. by J. A. Brydson, Applied Science Publishers (1978) and "Handbook of Thermoplastic Elastomers" edited by B. M. Walker, Van Norstrand Reinhold Co., (1979). However, most of the known crosslinking mechanisms are not suitable for roll-to-roll manufacturing processes because they require a high reaction temperature and also a long reaction time.

In one embodiment of the present invention, the crosslinking system involves the use of a multifunctional isocyanate or isothiocyanate and a crosslinker. The other crosslinking system for the present invention may involve the use of a multifunctional epoxide or aziridine and a crosslinker. The crosslinking based on either of the two crosslinking systems may be completed, to a large degree, during drying of the sealing layer, particularly when a catalyst is present.

In one embodiment, the crosslinking system may be compatible with the thermoplastic elastomer and may be dissolved or dispersed in the solvent used to prepare the sealing composition. The solvent preferably has a specific gravity lower than that of the electrophoretic fluid. To facilitate seamless sealing, the crosslinking system must be immiscible with the electrophoretic fluid. In one embodiment, the crosslinking system has a specific gravity lower than that of the electrophoretic fluid. The thermoplastic elastomer or the sealing composition also preferably has a specific gravity lower than that of the electrophoretic fluid.

Suitable multifunctional isocyanates include, but are not limited to, those derived from hexamethylene diisocyanate (HDI), isophorone diisocyanate (IPDI), toluene diisocyanate (TDI), 4,4'-diisocyanato diphenylmethane (MDI) and the like. Examples of commercially available multifunctional isocyanates include Desmodur Z4470 BA, N-100, N3200, N3600, N3400, Z4470 BA and Z4470 SN from Bayer. In one embodiment, Desmodur Z4470 BA and SN are the multifunctional isocyanates used. Suitable multifunctional isothiocyanates include those derived from hexamethylene diisothiocyanate, isophorone diisothiocyanate, toluene diisothiocyanate, 4,4'-diisothiocyanato diphenylmethane and the like.

In general, the crosslinker for the multifunctional isocyanate or isothiocyanate may be selected from a group consisting of multifunctional alcohols, thiols, ureas, thioureas, amines, anilines, water and the like.

In one embodiment, the crosslinkers for the multifunctional isocyanate and isothiocyanate may include polyols such as triethanol amine, N,N,N',N'-[tetrakis(2-hydroxyethyl)ethylene diamine], N,N,-diethanolaniline, polycaprolactone diol, poly(propylene glycol), poly(ethylene glycol), poly(tetramethylene glycol), polybutadiene diol and their derivatives or copolymers. Multranol 9157, 4012, ARCOL LG-650, ARCOL(R) LHT-240 from Bayer and polybutadiene diols (M.W.=1000–4000) are useful when the thermoplastic elastomer is selected from the group consisting of tri-block or di-block copolymers of styrene and isoprene, butadiene or ethylene/butylene, such as the Kraton™ D and G series from Kraton Polymer Company.

The total concentration of the multifunctional isocyanate or isothiocyanate and the crosslinker may be in the range of about 2-50% by weight, preferably about 10-40% by weight, of the dry weight of the sealing layer.

In one embodiment, the molar ratio of the hydroxy group (—OH) in the polyol crosslinker to the —NCO or —NCS group in the multifunctional isocyanate or isothiocyanate may be from about 1/9 to about 9/1, preferably from about 3/7 to about 7/3.

Suitable catalysts for the isocyanate-alcohol reaction include tertiary-amines, dibutyltin dilaurate, dimethyltin dichloride, dibutyltin dilauryl mercaptide, stannous octoate and the like. In one embodiment, dibutyltin dilaurate is used as the catalyst. The catalyst may be present in the amount of from about 0.01 to about 3% by weight, preferably from about 0.05-2% by weight, based on the dry weight of the sealing layer.

Suitable multifunctional epoxides include, but are not limited to, bisphenol A-epichlorhydrin condensates, (3,4-epoxycyclohexyl)methyl-3,4-epoxycyclohexanecarboxylate, vinylcyclohexane dioxide, glycidyl isooctyl ether, epoxidized polybutadiene, epoxidized oils and the like. Aliphatic epoxides are useful when the thermoplastic elastomer is selected from tri-block or di-block copolymers of styrene and isoprene, butadiene or ethylene/butylene, such as the Kraton™ D and G series from Kraton Polymer Company.

In one embodiment, multifunctional aziridine is trimethylolpropane tris(2-methyl-1-aziridine propionate), XAMA-2, XAMA-7 (polyfunctional aziridines from Goodrich) or the like.

A list of highly reactive crosslinkers or curatives for the multifunctional epoxide or aziridine can be found in "Structural Adhesives, Chemistry and Technology", ed. by S. R. Hartshorn, Plenum Press (1986); and "Handbook of Epoxy Resins" by H. Lee and K. Neville, McGrow-Hill, (1967). Examples of particularly suitable crosslinkers or curatives include multifunctional alcohols, thiols, carboxylic acids, ureas, thioureas, primary and secondary amines, anilines, anhydrides, Lewis acids and the like.

The total concentration of the multifunctional epoxide or aziridine and the crosslinker may be in the range of about 2-50% by weight, preferably about 10-40% by weight, of the dry weight of the sealing layer.

The sealing composition of the present invention is prepared by dissolving or dispersing all of the components in a solvent or solvent mixture, such as isopropyl acetate, butyl acetate, methyl ethyl ketone (MEK), methyl propyl ketone, cyclohexanone, toluene, xylene, cyclohexane, cycloheptane or a isoparaffin such as those of the Isopar series from Exxon Mobil Corp.

The sealing composition may then be overcoated onto the filled microcups to enclose and isolate the electrophoretic fluid within the microcups. The sealing composition is being hardened when in contact with the electrophoretic fluid. An electrode plate, optionally with a pre-coated adhesive layer, is laminated over the sealed microcups. The laminated assembly may be further post-cured at a temperature between about 50° C. to about 80° C. The sealing layer may also be partially cured after application to the sealed microcups and further post cured after the lamination step. The post curing may also be conducted at room temperature with no additional heat treatment.

EXAMPLES

The following examples are given to enable those skilled in the art to more clearly understand and to practice the present invention. They should not be considered as limiting the scope of the invention, but merely as being illustrative and representative thereof.

Preparation 1

Synthesis of a Reactive Protective Colloid R$_f$-amine

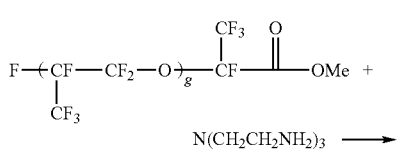

N(CH$_2$CH$_2$NH$_2$)$_3$ ⟶

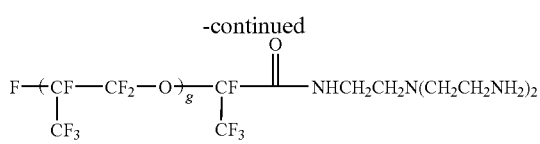

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of PFS2 solvent (perfluoropolyether from Solvay Solexis) and extracted with 20 ml of ethyl acetate three times and then dried to yield 17 gm of purified product ($R_f$-amine1900) which showed excellent solubility in HT200.

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure. $R_f$-amine350 was also prepared by the same procedure, except that the Krytox® methyl ester was replaced by CF$_3$CF$_2$CF$_2$COOCH$_3$ (from SynQuest Labs, Alachua, Fla.).

Preparation 2

Synthesis of a Reactive Fluorinated Pyridinium Salt

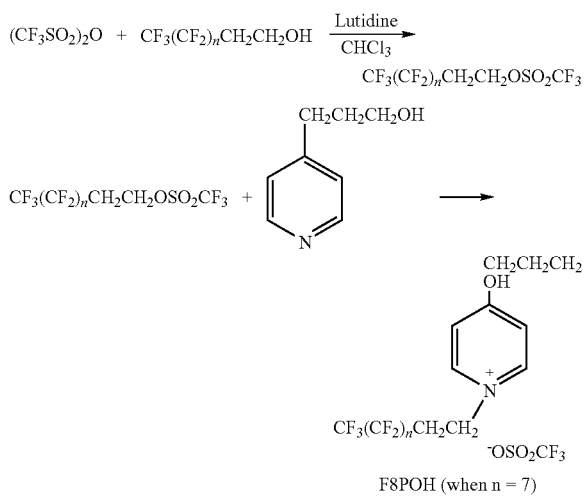

3.21 Gm (30.0 mmol) of 2,6-lutidine (Aldrich) and 11.6 gm (25.0 mmol) of 1H, 1H, 2H, 2H-perfluorodecanol [CF$_3$(CF$_2$)$_n$CH$_2$CH$_2$OH, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added drop-wise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H, 1H, 2H, 2H-perfluorodecyl triflate, CF$_3$(CF$_2$)$_n$H$_2$CH$_2$OSO$_2$CF$_3$, n=7) was obtained.

5.96 Gm (10 mmol) of the thus obtained 1H, 1H, 2H, 2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(3,3,4,4,5,5,6,6,7,7,8,8,9,9,10,10-heptadecafluoro-decyl)-4-(3-hydroxy-propyl)-pyridinium trifluoromethanesulfonate (hereinafter referred to as F8POH), was obtained.

Other fluorinated pyridinium salts with different alkyl chains, e.g., n=6, n=9, n=11 and a mixture of n=5, 6, 7, 8, etc. were also synthesized according to the same procedure.

Preparation 3

Synthesis of Fluorinated Cu Phthalocyanine Dye

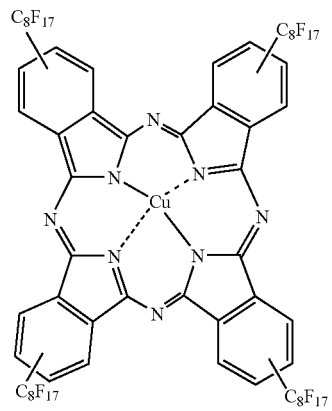

A fluorinated Cu phthalocyanine dye (CuPc-C$_8$F$_{17}$), was prepared according to U.S. Pat. No. 3,281,426. A mixture of copper phthalocyanine (41.0 gm, 71.2 mmole, Aldrich) and 1-iodoperfluorooctane (370 gm, 678 mmole, SynQuest) was added into a 1-gallon pressure reactor (Parr Instrument Co.) with a glass liner. The reactor was vacuum sealed at 1 Torr and heated at 375° C. for 3 days. The crude product obtained was mixed with 200 gm of Celite (Fisher Scientific) and extracted with 4 liters of PFS-2™ in Soxhlet extractor for 5 days. The dark blue solution obtained was washed with 4 liters of acetone 3 times and evaporated to dryness by rotary evaporation (60° C.) under vacuum (~5 Torr). A dark blue solid was obtained (106 gm, 66% yield).

Preparation 4

Preparation of TiO$_2$-Containing Microparticles 9.50 Gm of Desmodur® N3400 aliphatic polyisocyanate (from Bayer AG) and 0.49 gm of TEA (triethanolamine from Dow Chemicals) were dissolved in 3.79 gm of acetone. To the resultant solution, 13 gm of TiO$_2$ R706 (from DuPont) was added and homogenized for 2.5 minutes with a rotor-stator homogenizer (IKA ULTRA-TURRAX T25) at room temperature. A solution containing 0.45 gm of F8POH prepared from Preparation 2, 1.67 gm of 1,5-pentanediol (BASF), 1.35 gm of polypropylene oxide (mw=750, from Aldrich) and 2.47 gm acetone (99.9% minimum by GC, Burdick & Jackson) was added and homogenized for 1 minute; and finally 0.32 gm of a 2% solution of dibutyltin dilaurate (Aldrich) in acetone was added and homogenized for an additional minute. To the resultant slurry, 0.9 gm of $R_f$-amine4900 from Preparation 1 in 40.0 gm of HT-200 (from Solvay Solexis) was added and homogenized for 2 minutes, followed by addition of additional 0.9 gm of the Rf-amine4900 and 0.35 gm of a perfluorinated Cu phthalocyanine dye, $CuPc-C_8F_{17}$ from Preparation 3, in 33.0 gm of HT-200 and homogenization for 2 minutes.

A microcapsule dispersion of low viscosity was obtained. The microcapsule dispersion was then heated at 50° C. overnight and then stirred at 80° C. for an additional hour under low shear to post-cure the particles. The post-cured microcapsule dispersion was filtered through a 400 mesh (38 micrometer) screen and the solid content of the filtered dispersion was measured to be 32% by weight with an IR-200 Moisture Analyzer (Denver Instrument Company). The particle size distribution of the filtered dispersion was measured with the Beckman Coulter LS230 Particle Analyzer. The mean diameter was 1.02 µm and the standard deviation was 0.34 µm.

Preparation 5

A. Primer Coated Transparent Conductor Film

A primer coating solution containing 33.2 gm of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (trimethylolpropane triacrylate, UCB, Smyrna, Ga.), 20.61 gm of HDODA (1,6-hexanediol diacrylate, UCB, Smyrna, Ga.), 2 gm of Irgacure™ 369 ((2-benzyl-2-(dimethylamino)-1-[4-(4-morpholinyl)phenyl]-1-butanone), Ciba, Tarrytown, N.Y.), 0.1 gm of Irganox™ 1035 (thiodiethylene bis(3,5-di(tert)-butyl-4-hydroxyhydrocinnamate), Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, then exposed to 1.8 $J/cm^2$ of UV light under nitrogen using a UV conveyer (DDU, Los Angles, Calif.).

B. Preparation of Microcups

TABLE 1

Microcup Composition

| Component | Weight Part | Source |
|---|---|---|
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (isopropyl-9H-thioxanthen-9-one, Aldrich, Milwaukee, Wis.), 0.1 gm of Irganox™ 1035 (Ciba, Tarrytown, N.Y.) and 20.61 gm of HDODA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 µm (length)× 72 µm (width)×35 µm (depth)×13 µm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 5A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 $mJ/cm^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 $J/cm^2$.

C. Filling and Sealing with a Sealing Composition

1 Gm of an electrophoretic fluid containing 6% by weight (dry weight) of the $TiO_2$ microcapsules from Preparation 4 and 1.3% by weight of $CuPc-C_8F_{17}$ prepared from Preparation 3 in a perfluoropolyether solvent, HT-200, was filled into the 4"×4" microcup array prepared from Preparation 5B using a #0 drawdown bar. The excess of fluid was scraped away by a rubber blade.

A sealing composition as indicated in each of the examples below is then overcoated onto the filled microcups using a Universal Blade Applicator and dried at room temperature to form a seamless sealing layer of about 2-3 µm dry thickness with good uniformity.

D. Lamination of Electrode Layer

An adhesive solution was first coated onto the ITO side of a 5-mil ITO/PET film. The adhesive composition used is indicated in each example below. The coated film was then laminated over the sealed microcups by a laminator at 100° C. at a linear speed of 20 cm/min.

Comparative Example 1

A sealing composition containing 12.0 gm of Kraton™ FG1901X (S-EB-S type block polymer), 22.7 gm of Kraton™ RPG6919 (S-EB-S type block polymer), 204.8 gm of Kraton™ G1650 (S-EB-S block polymer), all of Kraton Polymers, 1997 gm of IsoparE (from Exxon Mobil), 222 gm of isopropyl acetate, 1.07 gm of Disperbyk-142 (solution of a phosphoric ester salt of a high molecular weight copolymer with pigment affinic groups, from BYK-Chemie), 4.50 gm of Silwet L7500 (polyalkyleneoxide modified polydimethylsiloxane, from OSi) and 35.8 gm of carbon black (Vulcan™ XC72 from Cabot Corp.) was thoroughly mixed with a Silverson mixer at 10500 rpm at room temperature. The resultant dispersion was filtered through a 20 µm filter and overcoated onto the filled microcup array as described in Preparation 5C.

An adhesive composition containing 10 parts by weight of a solution of 25% Orasol™ Black RLI (from Ciba Specialty chemicals) in MEK and 20 parts by weight of a Duro-Tak™ 80-1105 adhesive (from National Starch) in 130 parts by weight of MEK was coated on the ITO side of an ITO/PET conductor film (5 mil OC50 from CPFilms) by a drawdown bar with a target dry coverage of about 2 $gm/m^2$. The coated film was then laminated over the sealed microcups by a laminator at 100° C. at a linear speed of 20 cm/min as in Preparation 5D to complete the display assembly.

Figure 2:
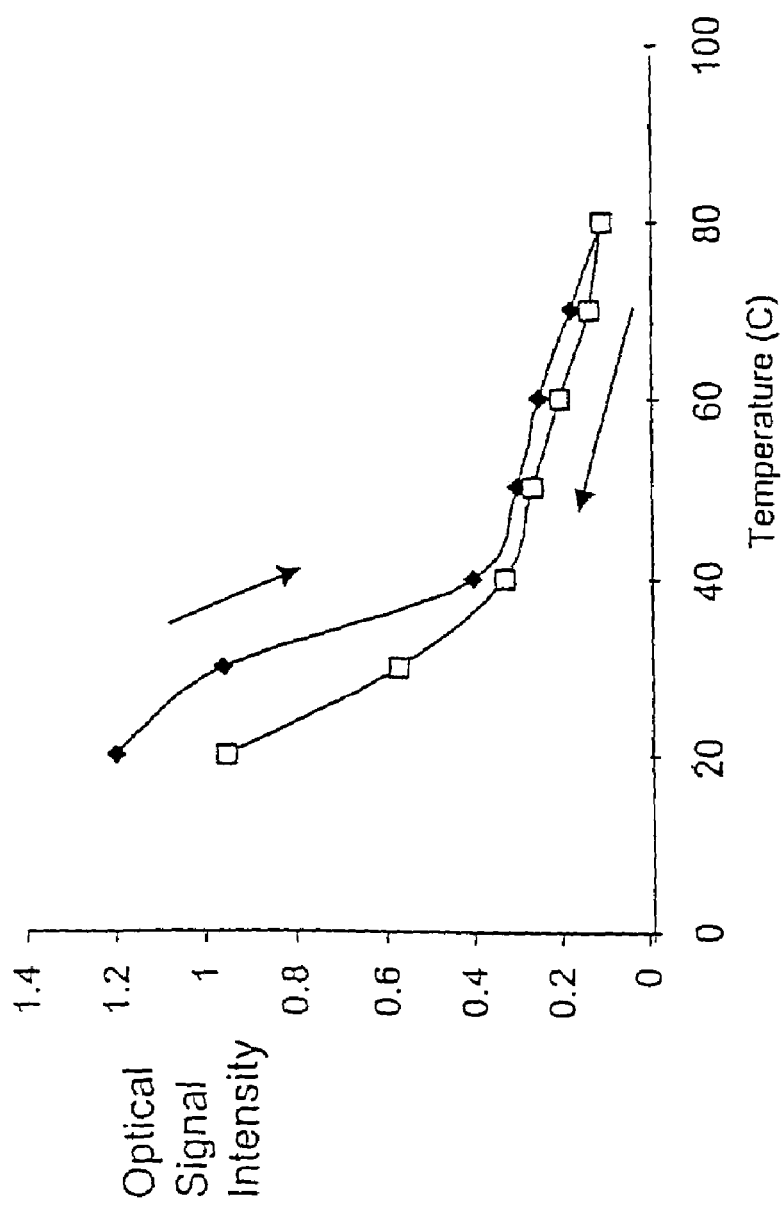
FIG. 2 is the optical signal vs. operation temperature curve for Comparative Example 1. The arrows show the direction of heating or cooling sequence of the measurements.

The bottom of the display was blackened with a black paint and the display was placed on a thermoelectric module for controlling the operating temperature of the display. The display was driven at ±90V and 0.2 Hz electrical pulsing waveform. An incoming light from an optical fiber cable connected to a light source was illuminated on the display and the reflecting light was collected and converted into electrical signal by a photo-electric detector and finally the display electro-optic response was displayed on the screen of an oscilloscope. The intensity of the optical output signal is a measurement of contrast ratio of the display. The electro-optic response as a function of display operation temperature is shown in FIG. 2. As it can be seen from FIG. 2, the optical signal or contrast ratio decreases dramatically with increasing operation temperature from 20 to 80° C. At temperatures higher than 50° C., little optical signal could be detected. The arrows in the figure indicate the direction of heating and cooling sequence of the measurements. In this case, the operation temperature was increased from 20° C. with 10° C. increments to 80° C., then lowered back to 20° C. A noticeable hysteresis loop with a reduced contrast ratio was also observed between 20 to 40° C. The % signals at three temperatures (20° C., 50° C. and 80° C.) normalized to the signal intensity at 20° C. are listed in Table 1.

Examples 2

The procedure of Example 1 was repeated except that a crosslinking system was included in the composition of sealing layer. Thus, 11.6 gm of Kraton™ FG1901X, 221 gm of Kraton™ G1650, 23.1 gm of ARCOL(R) LHT-240 Polyol (a polyether polyol from Bayer), 2099 gm of IsoparE, 172.5 gm of isopropyl acetate, 1.24 gm of Disperbyk-142 and 4.54 gm of Silwet L7500 and 41.5 gm of carbon black (Vulcan™ XC72 from Cabot Corp.) were mixed and homogenized thoroughly with a Silverson mixer at 10500 rpm at room temperature and filtered through a 20 µm filter. To the filtered dispersion, 35.0 gm of polyisocyanate Desmodur Z4470 BA (from Bayer) and 0.58 gm of dibutyltin dilaurate were added and mixed thoroughly at room temperature. The resultant sealing composition was then overcoated onto the filled microcup array, and the sealed microcup array was laminated onto the conductor/adhesive film as described in Preparation 5D.

Figure 3:
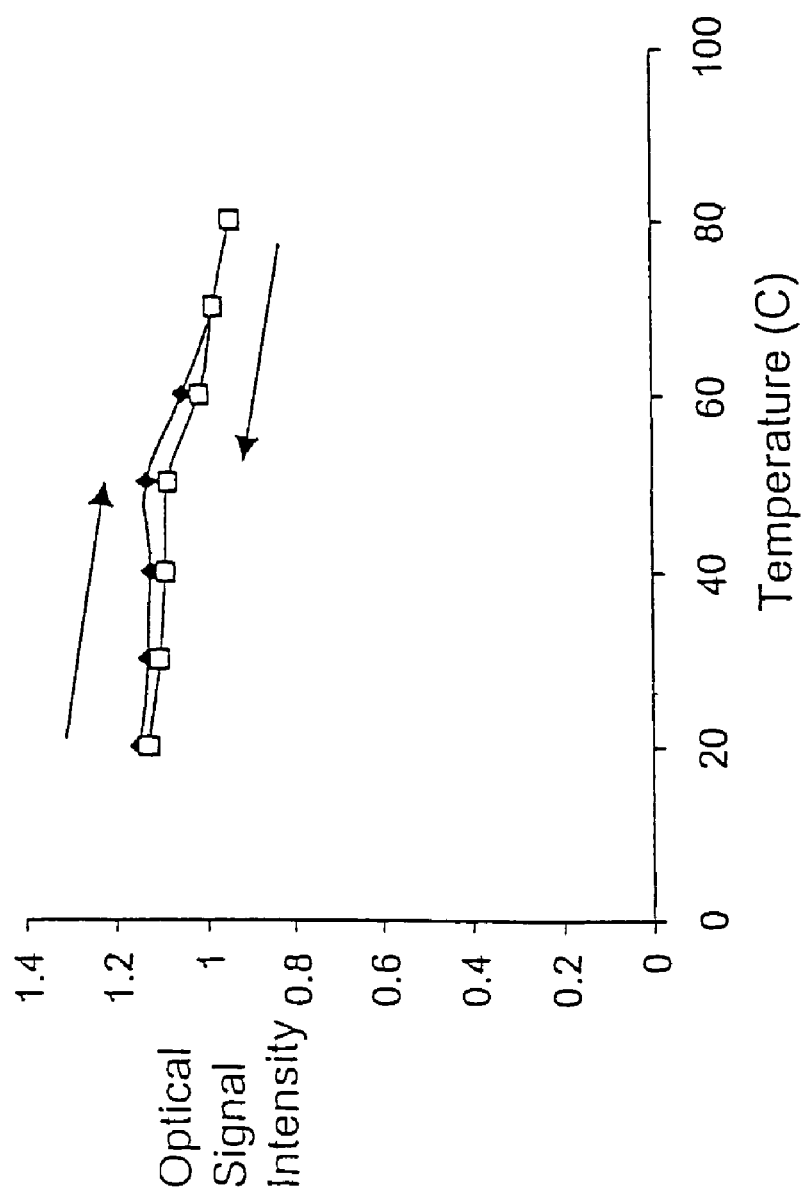
FIG. 3 is the optical signal vs. operation temperature curve for Example 2. The arrows show the direction of heating or cooling sequence of the measurements.

The laminated assembly was further cured at 65° C. for 30 minutes. The electro-optic response as a function of the display operation temperature is shown in FIG. 3. Negligible changes in optical signal or contrast ratio of the display was observed between 20 to 60° C. The % signals at three temperatures (20° C., 50° C. and 80° C.) normalized to the signal intensity at 20° C. are listed in Table 1.

Example 3

The procedure of Example 2 was followed except the conductor film was precoated with a polyurethane adhesive solution comprising 13.44% by weight of a thermoplastic polyurethane P9820 (from Huntsman Polyurethanes), 5.6% by weight of polyisocyanate DESMODUR N-100 (from Bayer) and 1% by weight of catalyst KK-348 (from King Industry) in (92.5/7.5) MEK/ethyl acetate. The % signals at three temperatures (20° C., 50° C. and 80° C.) normalized to the signal intensity at 20° C. are listed in Table 1.

Example 4

The procedure of Example 2 was repeated except that the 23.1 gm of polyether polyol, ARCOL(R) LHT240, in the crosslinking system was replaced with 41.5 gm of PBdiol (polybutadiene diol, MW=3400, from Aldrich) and the amount of the polyisocyanate, Desmodur Z4470 BA, was lowered to 11.9 gm. The % signals at three temperatures (20° C., 50° C. and 80° C.) normalized to the signal intensity at 20° C. are listed in Table 1.

TABLE 1

| Example | Crosslinking In Sealing Layer | Lamination Adhesive | % Normalized Optical Signal (20° C.) | % Normalized Optical Signal (50° C.) | % Normalized Optical Signal (80° C.) |
|---|---|---|---|---|---|
| 1 | None | PSA/dye | 100 | 0 | 0 |
| 2 | Desmodur Z4470 BA/ ARCOL(R) LHT240 | PSA/dye | 100 | 100 | 87 |
| 3 | Desmodur Z4470 BA/ ARCOL(R) LHT240 | PU9820/ Desmodur N100 | 100 | 100 | 85 |
| 4 | Desmodur Z4470 BA/ PBdiol | PSA/dye | 100 | 100 | 70 |

As can be seen from Table 1, the display signal intensity or contrast ratio at high temperatures was significantly improved by the presence of a crosslinking system of the present invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display comprising display cells wherein said display cells are filled with an electrophoretic fluid and sealed with a sealing layer formed from a sealing composition comprising a thermoplastic elastomer and a crosslinking system wherein said crosslinking system comprises a multifunctional isocyanate and a polyol and the molar ratio of the hydroxy group in the polyol to the —NCO group in the multifunctional isocyanate is from about 1/9 to about 9/1, and said sealing layer is on top of, and in contact with, said electrophoretic fluid.

2. The electrophoretic display of claim 1 wherein said thermoplastic elastomer is selected from the group consisting of polyurethanes, polyesters, polyolefins and tri-block or di-block copolymers of styrene or α-methylstyrene and isoprene, butadiene or ethylene/butylenes, crystalline rubbers and ethylene propylene diene rubber terpolymers.

3. The electrophoretic display of claim 1 wherein said multifunctional isocyanate is selected from the group consisting of hexamethylene diisocyanate, isophorone diisocyanate, toluene diisocyanate, 4,4'-diisocyanato diphenylmethane and the polyisocyanates derived therefrom.

4. The electrophoretic display of claim 1 wherein said polyol is triethanol amine, N,N,N',N'-[tetrakis(2-hydroxyethyl)ethylene diamine], N,N,-diethanolaniline, polycaprolactone diol, poly(propylene glycol), poly(ethylene glycol), poly(tetramethylene glycol), polybutadiene diol or a derivative or copolymer thereof.

5. The electrophoretic display of claim 1 wherein the multifunctional isocyanate and the polyol have a total concentration in the range of about 2-50% by weight of the dry weight of the sealing layer.

6. The electrophoretic display of claim 5 wherein the multifunctional isocyanate and the polyol have a total concentration in the range of about 10-40% by weight of the dry weight of the sealing layer.

7. The electrophoretic display of claim 1 wherein the molar ratio of the hydroxy group in the polyol to the —NCO group in the multifunctional isocyanate is from about 3/7 to about 7/3.

8. The electrophoretic display of claim 1 wherein said crosslinking system further comprises a catalyst.

9. The electrophoretic display of claim 8 wherein said catalyst is selected from the group consisting of tertiary amines, dibutyltin dilurate, dimethyltin dichloride, dibutyltin dilauryl mercaptide and stannous octoate.

10. The electrophoretic display of claim 1 wherein said sealing composition further comprises isopropyl acetate, butyl acetate, methyl ethyl ketone, methyl propyl ketone, cyclohexanone, toluene, xylene, cyclohexane, cycloheptane or an isoparaffin.

11. The electrophoretic display of claim 1 wherein said sealing composition further comprises pigment or conductive particles.

12. The electrophoretic display of claim 1 wherein said sealing composition is incompatible with the electrophoretic fluid.

13. The electrophoretic display of claim 1 wherein said sealing composition has a specific gravity lower than that of the electrophoretic fluid.

14. The electrophoretic display of claim 1 wherein said sealing composition is being hardened when it is in contact with the electrophoretic fluid.

15. An electrophoretic display comprising display cells wherein said display cells are filled with an electrophoretic fluid and sealed with a sealing layer formed from a sealing composition comprising a thermoplastic elastomer and a crosslinking system wherein said crosslinking system comprises a multifunctional isothiocyanate and a crosslinking agent for the multifunctional isothiocyanante and said multifunctional isothiocyanate is selected from the group consisting of hexamethylene diisothiocyanate, isophorone diisothiocyanate, toluene diisothiocyanate, 4,4'-diisothiocyanato diphenylmethane and the polyisothiocyanates derived therefrom, and said sealing layer is on top of, and in contact with, said electrophoretic fluid.

16. The electrophoretic display of claim 15 wherein said multifunctional isothiocyanate is hexamethylene diisothiocyanate, isophorone diisothiocyanate or a polyisothiocyanate derived therefrom.

17. The electrophoretic display of claim 15 wherein said crosslinking agent is selected from the group consisting of multifunctional alcohols, thiols, ureas, thioureas, amines, anilines and water.

18. The electrophoretic display of claim 15 wherein said crosslinking agent is a polyol.

19. The electrophoretic display of claim 18 wherein said polyol is triethanol amine, N,N,N',N'-[tetrakis(2-hydroxyethyl)ethylene diamine], N,N,-diethanolaniline, polycaprolactone diol, poly(propylene glycol), poly(ethylene glycol), poly(tetramethylene glycol), polybutadiene diol or a derivative or copolymer thereof.

20. The electrophoretic display of claim 15 wherein said crosslinking system further comprises a catalyst.

21. The electrophoretic display of claim 15 wherein said sealing composition further comprises isopropyl acetate, butyl acetate, methyl ethyl ketone, methyl propyl ketone, cyclohexanone, toluene, xylene, cyclohexane, cycloheptane or an isoparaffin.

22. The electrophoretic display of claim 15 wherein said sealing composition further comprises pigment or conductive particles.

23. The electrophoretic display of claim 15 wherein said sealing composition is incompatible with the electrophoretic fluid.

24. The electrophoretic display of claim 15 wherein said sealing composition has a specific gravity lower than that of the electrophoretic fluid.

25. The electrophoretic display of claim 15 wherein said sealing composition is being hardened when it is in contact with the electrophoretic fluid.

26. An eleetrophoretic display comprising display cells wherein said display cells are filled with an electrophoretic fluid and sealed with a sealing layer formed from a sealing composition comprising a thermoplastic elastomer and a crosslinking system wherein said crosslinking system comprises a multifunctional epoxide and a crosslinking agent for the multifunctional epoxide and said multifunctional epoxide is selected from the group consisting of bisphenol A-epichlorhydrin condensates, (3,4-epoxycyclohexyl)methyl-3,4-epoxycyclohexanecarboxylate, vinylcyclohexane dioxide, glycidyl isooctyl ether, epoxidized polybutadiene, aliphatic epoxide, and epoxidized oils, and said sealing layer is on top of, and in contact with, said electrophoretic fluid.

27. The electrophoretic display of claim 26 wherein said multifunctional epoxide is an aliphatic epoxide.

28. The electrophoretic display of claim 26 wherein said crosslinking agent is selected from the group consisting of multifunctional alcohols, thiols, carboxylic acids, ureas, thioureas, primary and secondary amines, anilines, anhydrides and Lewis acids.

29. The electrophoretic display of claim 26 wherein said crosslinking system further comprises a catalyst.

30. The electrophoretic display of claim 26 wherein said sealing composition further comprises isopropyl acetate, butyl acetate, methyl ethyl ketone, methyl propyl ketone, cyclohexanone, toluene, xylene, cyclohexane, cycloheptane or an isoparaffin.

31. The electrophoretic display of claim 26 wherein said sealing composition further comprises pigment or conductive particles.

32. The electrophoretic display of claim 26 wherein said sealing composition is incompatible with the electrophoretic fluid.

33. The electrophoretic display of claim 26 wherein said sealing composition has a specific gravity lower than that of the electrophoretic fluid.

34. The electrophoretic display of claim 26 wherein said sealing composition is being hardened when it is in contact with the electrophoretic fluid.

* * * * *